UNITED STATES PATENT OFFICE.

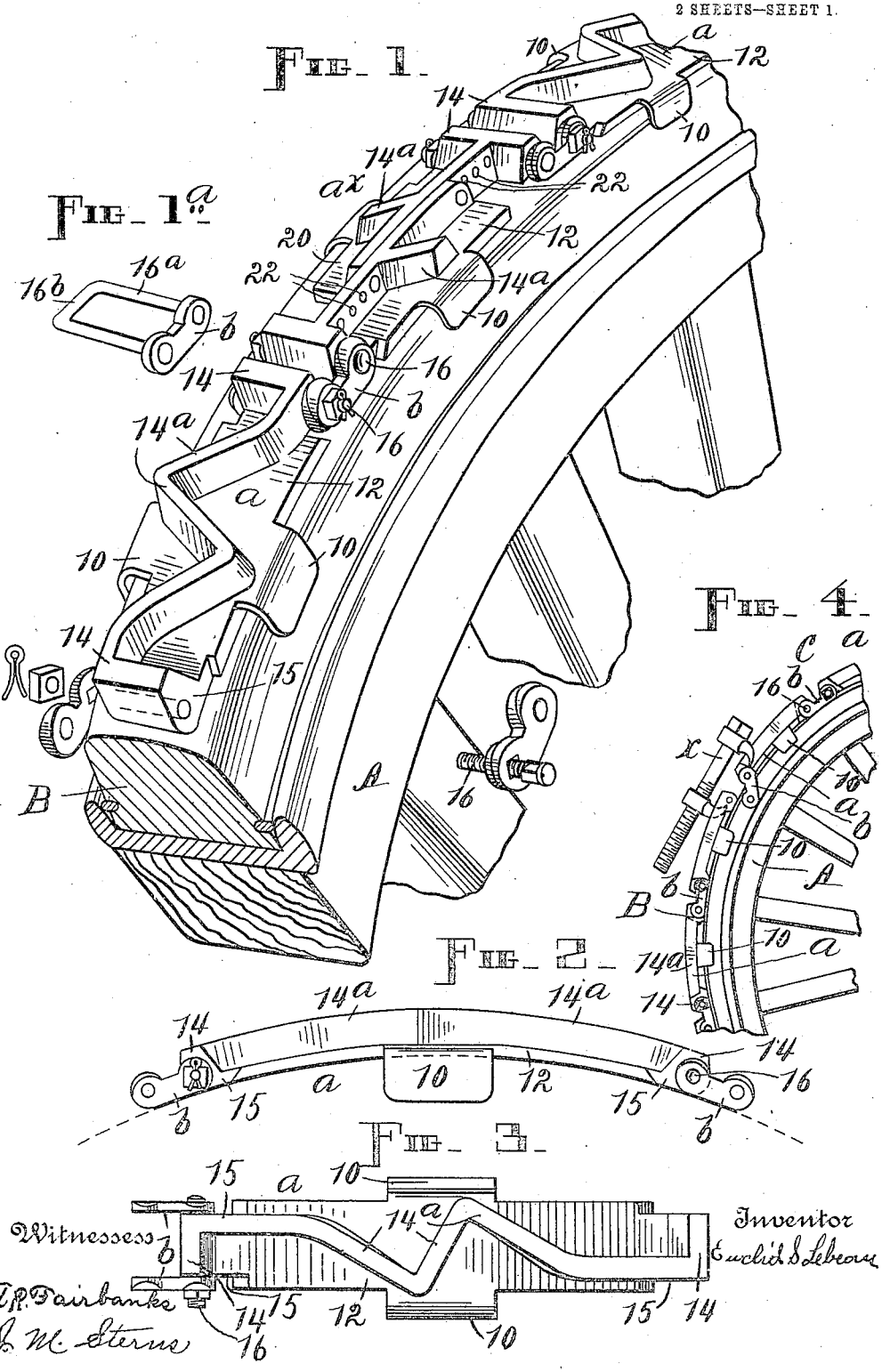

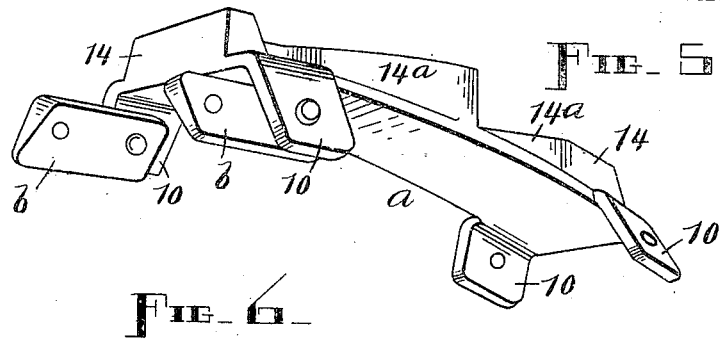
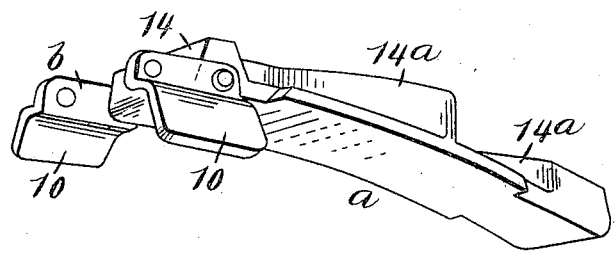
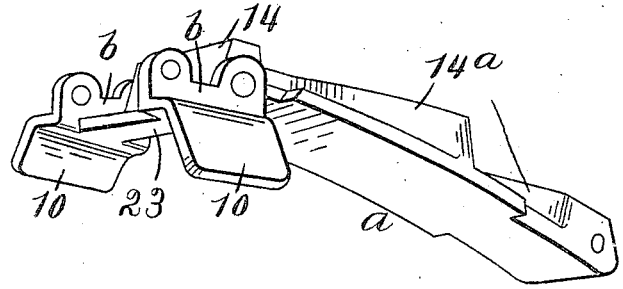
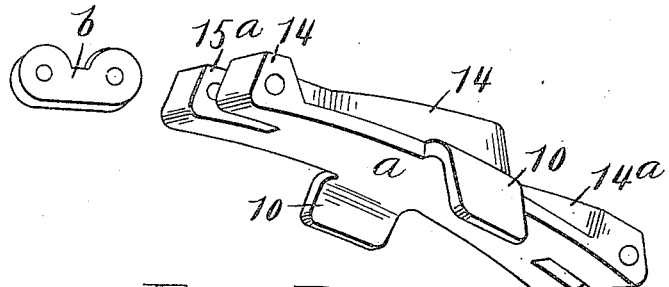
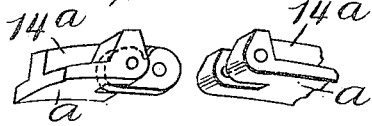

EUCLID S. LEBEAU, OF SPRINGFIELD, MASSACHUSETTS.

SLIP-PREVENTING AND TIRE-ARMORING DEVICE FOR WHEELS.

No. 838,628.     Specification of Letters Patent.     Patented Dec. 18, 1906.

Application filed October 13, 1905. Serial No. 282,579.

*To all whom it may concern:*

Be it known that I, EUCLID S. LEBEAU, a citizen of the United States of America, residing in Springfield, in the county of Hampden and State of Massachusetts, have invented certain new and useful Improvements in Slip-Preventing and Tire-Armoring Devices for Wheels, of which the following is a specification.

This invention relates to slip-preventing devices for wheels of vehicles, and more especially those of heavy automobile-trucks.

The primary object of the invention is to provide an appliance which will be entirely practical and efficient for preventing slipping or skidding of the wheel on roads rendered slippery by reason of snow or ice and which appliance, moreover, will serve as an armor for materially protecting the tire of the wheel from wear.

Various other objects are attained in and by the structural features of the devices, as will be hereinafter rendered apparent.

While especially designed for hard-rubber tires, the appliance may be employed directly on the felly or rim of a wheel and serve as a tire as well as an antiskid device.

The invention consists of an endless band comprising a series of pivotally-jointed links to encircle the wheel tire or rim, said links having at their outer faces projections or calks, a plurality of said links having at their side portions lips which project angularly from the plane of the bases of the links toward the axial center of the band for sidewise engaging the tire or rim of the wheel for the retention of the device thereon.

The invention further consists in the appliance comprising in the component parts thereof particular constructions and features, all substantially as will be hereinafter described.

The improvements are illustrated in the accompanying drawings, in which—

Figure 1 is a perspective view of a tread portion of a wheel having the improved appliance thereon. Fig. 1ª is a perspective view in detail to be hereinafter referred to. Fig. 2 is a side view of one of the calks and side-lip-provided main links and the secondary jointing-links at the ends thereof, it being understood that a sufficient number of these links are provided to make up the metallic endless-wheel encircling appliance. Fig. 3 is a plan view of Fig. 2. Fig. 4 is a side elevation of a portion of the wheel and the corresponding encircling portion of the novel slip-preventing appliance in its place thereon and showing a form of clamp and the manner of utilization of the same for bringing the link-formed band tightly around the tired wheel. Figs. 5, 6, 7, 8, and 9 are perspective views showing modifications in respect of the subordinate details of construction of the band-constituting links.

Similar characters of reference indicate corresponding parts in all of the views.

In the drawings, A represents the felly of the wheel, provided with a solid-rubber tire B.

C represents a portion of the endless slip-preventing and tire-armoring appliance, which is fully sufficient to indicate the endless character thereof and its location on the tread portion of the wheel.

Now, referring more particularly to Sheet 1 of the drawings, $a\ a$ represent the main links, and $b\ b$ represent the smaller secondary links which pivotally unite the adjacent end portions of the main link. Some of the links, as many thereof as occasion may require, are provided at their side portions with lips or flanges 10, which project angularly from the plane of the base of the links toward the axial center of the band and wheel for engagements at both sides of the tread portion of the wheel for preventing displacement of the device. The larger or main links $a$, which comprise flat bases 12, having sufficient width for covering an ample portion of the tire-tread, have at their outer or tread sides calks, some of which are transverse, as shown at 14, and some of which are oblique to the length of the band and of the individual links thereof, as indicated at $14^a$.

The main links, the ends of which are closely jointed, as shown in Figs. 1 and 4, are or may be constructed with sidewise recesses 15 at their end portions for the compact disposition within such recesses of the secondary or connecting links $b$, which are comparatively thin, pivots 16 passing through the end portions of the links $b$, which overlap sidewise at the end portions of the main links and through the transverse calks 14 at the ends of the main links. These pivots may be simple rivets employed generally throughout the entire jointed appliance or they may consist of bolts receiving at their threaded ends confining-nuts, and the extremities of the bolts may be transversely perforated and receive cotter-pins, or double pivots, as shown in staple-shaped part 16ª, Fig. 1ª, may be employed to engage by its extremities the small link b at one side of the band, the uniting portions of the staple 16ᵇ serving as or in substitution of the link at the other side.

The transverse calks prevent the slipping of the wheel in the line of travel, while the oblique calks prevent sidewise slipping or sluing.

This endless appliance is preferably made whereby adjacent link-formed parts thereof may be unjointed or detached, so that even while all but one of the pivots might be permanently-headed rivets one of the pivots would be a detachable bolt with a nut therefor. Therefore preparatory to bringing the appliance in tight encircling engagement about a solid-rubber tire of a wheel the temporarily-detached ends of the link-formed band may be engaged by the jaws of a screw-clamp, such as indicated at $x$, the operation of which is to exert a powerful draft on the adjacent links to be drawn to just the right position for making the pivotal engagement and rendering the band endless.

Inasmuch as there are slight circumferential differences in wheels of presumed standard sizes for which these appliances are to be made and for assurance that the latter may be applicable for firm engagement about the wheels, notwithstanding differences in their circumferential dimensions, one of the links is, as represented at the portions $a^\times$ in Fig. 1, made in the separate sections 20 20, adjustable one endwise relatively to the other and provided with means for confining these link-sections in their adjusted relations. As here specifically shown, portions of the calks comprised in the sections 20 20 are made in the form of the longitudinal ribs having perforations for rivet or bolt engagements, and all manifestly so that this one link may be shortened or lengthened, as occasion may require, and without depriving such link of the slip-preventing and tire-engaging capabilities which it should possess.

Various changes in details of construction may be made without departure from my invention—as, for instance, as indicated in Fig. 5, wherein it is shown that the engaging side lip 10 10 may be located at the ends of the main links and receive the pivotal connections therewith of the secondary links b b, or, as indicated in Fig. 6, wherein the separately-formed secondary links b have the sidewise engaging or retaining lips 10 10 formed as parts of these links b instead of the main links a, or, as indicated in Fig. 7, wherein the secondary links b b and the retaining-lips 10 10 are made integrally by reason of the narrow uniting cross-bar 23, or, as indicated in Fig. 8, wherein it is shown that the adjoining end portions of the main links a may be united by a single secondary link b, having its extremities located and engaged within a longitudinal recess 15ª, longitudinally formed between the sides of the main link, or the main links a a may be directly pivotally connected at their adjoined ends by being "halved" together or having at the jointed portions a tongue on the one link and a recess for the reception of the tongue on the other, these matched parts being united by the connection rivet or other form of pivot.

Having thus described my invention, what I claim, and desire to secure by Letters Patent, is—

1. In a slip-preventing appliance for wheels, an endless band comprising a series of pivotally-jointed links to encircle the wheel tire or rim, a plurality of said links having zigzag calks at their outer or tread sides, the angles of said calks lying adjacent to the lateral edges of the links, and also having retaining-lips which project angularly from the edges of the links adjacent to the middle calk-angles and extend toward the axial center of the band.

2. In a slip-preventing appliance for wheels, an endless band comprising a series of pivotally-jointed links to encircle the wheel rim or tire, a plurality of said links having zigzag calks at their tread sides the angles of which are adjacent to the lateral edges of the links.

3. In a slip-preventing appliance for wheels, an endless band comprising a series of pivotally-jointed links to encircle the wheel rim or tire, a plurality of said links having transverse calks and intermediate zigzag calks the angles of which latter are adjacent to the lateral edges of the links.

4. In a slip-preventing appliance for wheels, an endless band comprising a series of pivotally-jointed links to encircle the wheel rim or tire, a plurality of said links having transverse and zigzag calks at their outer or tread sides, and means forming portions of a plurality of the links for preventing the sidewise displacement of the band from the tread portion of the wheel.

5. In a slip-preventing appliance for wheels, an endless band comprising a series of pivotally-jointed links to encircle the wheel tire or rim, a plurality of said links having projections at their outer or tread sides, means comprised in said band for sidewise engagement of the tread portion of the wheel, one of said links being formed in sections adjustable endwise one relatively to the other, calks extending longitudinally of such sections along adjacent edges thereof, and means for fastening said longitudinal calks together to confine said link-sections in their adjusted relations.

6. A wheel having at the tread portion thereof a detachable encircling endless band comprising a series of pivotally-jointed links, a plurality of said links having calks projecting from their outer faces in transverse and zigzag directions, and means formed as parts of a number of the links for sidewise engaging the wheel and preventing lateral displacement of said band.

7. A wheel having at the tread portion thereof a detachable encircling band comprising a series of pivotally-jointed links, a plurality of which have transverse and zigzag calks projecting from their outer faces, and a number of the links having lips at the side portions thereof which extend inwardly toward the axial center of the wheel.

8. In a slip-preventing device for wheels, an endless band comprising a series of links having transverse calks at their ends, and secondary links pivotally joining the end portions of the calk-provided links by being connected with adjacent ends of said calks.

9. In a slip-preventing device for wheels, an endless band comprising a series of links having transverse calks at their ends, and secondary links pivotally joining the end portions of the calk-provided links by being connected with adjacent ends of said calks, a plurality of the comprised links having lips projecting toward the axial center of the band, for the purpose set forth.

10. In a slip-preventing device for wheels, an endless band comprising a series of links provided with transverse calks at their ends and having widths to substantially cover the tread portion of the wheel, and transversely narrow secondary links in opposite pairs sidewise overlapping and pivotally connected to the adjacent end portions of said calks.

11. In a slip-preventing device for wheels, an endless band comprising a series of endwise adjacent calk-provided links having widths to substantially cover the tread portion of the wheel, and constructed with opposite side recesses at their end portions, and transversely narrow secondary links in opposite pairs sidewise overlapping and pivotally connected to the adjacent end portions of the calk-provided links, and disposed within the said recesses in such links.

12. In a slip-preventing device for wheels, an endless band comprising a series of endwise calk-provided links having widths to substantially cover the tread portion of the wheel, and constructed with opposite side recesses at their end portions and with retaining-lips which project angularly from the edges of the wide portions of said links, and transversely narrow secondary links in opposite pairs sidewise overlapping and pivotally connected to the adjacent end portions of the calk-provided links, and disposed within the said recesses in such links.

13. In a slip-preventing appliance for wheels, an endless band comprising a series of jointed links to encircle the wheel rim or tire, a plurality of said links having transverse calks at the ends and continuous zigzag connecting-calks between said transverse calks, substantially as shown.

14. In a slip-preventing appliance for wheels, a link adapted to be fastened on the tread portion of the wheel rim or tire and provided on its tread-face with transverse end calk portions and with an intermediate calk portion connecting said transverse portions, the middle part of said intermediate portion being zigzaged and the terminals of this portion lying substantially parallel with the lateral edges of the link.

In testimony whereof I have signed my name to this specification in the presence of two subscribing witnesses.

EUCLID S. LEBEAU.

Witnesses:
J. M. STERNS,
ALLEN WEBSTER.